United States Patent
Avdokhin et al.

(10) Patent No.: US 8,452,147 B2
(45) Date of Patent: May 28, 2013

(54) ASSEMBLY FOR MEASURING OPTICAL SIGNAL POWER IN FIBER LASERS

(75) Inventors: Alexey V. Avdokhin, Oxford, MA (US); Victor Ilyashenko, Norhtborror, MA (US)

(73) Assignee: IPG Photonics Corporation, Oxford, MA (US)

( * ) Notice: Subject to any disclaimer, the term of this patent is extended or adjusted under 35 U.S.C. 154(b) by 1066 days.

(21) Appl. No.: 12/316,331

(22) Filed: Dec. 10, 2008

(65) Prior Publication Data

US 2010/0142906 A1   Jun. 10, 2010

(51) Int. Cl.
*G02B 6/00* (2006.01)
*H01S 3/30* (2006.01)

(52) U.S. Cl.
USPC .............................................. 385/135; 372/6

(58) Field of Classification Search
USPC ........................................ 385/48, 135; 372/6
See application file for complete search history.

(56) References Cited

U.S. PATENT DOCUMENTS

| | | | | |
|---|---|---|---|---|
| 4,399,541 | A | * | 8/1983 | Kovats et al. .................. 372/36 |
| 7,371,019 | B2 | * | 5/2008 | Seifert ............................. 385/96 |
| 8,274,732 | B2 | * | 9/2012 | Tamaoki .................... 359/341.3 |
| 2006/0165343 | A1 | * | 7/2006 | Seifert ............................. 385/12 |

* cited by examiner

*Primary Examiner* — Uyen-Chau N Le
*Assistant Examiner* — John M Bedtelyon
(74) *Attorney, Agent, or Firm* — Yuri Kateshov; Timothy J. King

(57) ABSTRACT

A fiber laser system is configured with a power measuring assembly surrounding a splice between two fibers. The power measuring assembly is operative to maintain the splice at a substantially constant splice temperature and shield the spliced fibers from external bending stresses so as to provide for power readings of the laser system at the splice independently from the influence of multiple variable external factors.

11 Claims, 2 Drawing Sheets

ASSEMBLY FOR MEASURING OPTICAL SIGNAL POWER IN FIBER LASERS

BACKGROUND OF THE DISCLOSURE

1. Field of the Disclosure

This invention relates to a device for measuring optical power at a splice between adjoining optical fibers.

2. Prior Art Discussion

The correct power readings of light radiated by a fiber laser system are necessary to maintain the system energy budget and meet specified requirements. Unfortunately, the known devices and methods utilized for measuring such power may be unsatisfactory.

One way of determining the optical power of radiated light includes the use of a bulk component. The bulk component has a tap bleeding off a portion of dispersed light to be further analyzed. Such a device may have a few undesirable characteristics including, but not limited to, a nonlinear dependence of power losses from input power and vulnerability of device components to high temperatures and mechanical stresses associated with high powers.

Another power measuring may involve the utilization of tap couplers. However, the tap couplers are not reliable at high temperatures. Furthermore, tap couplers associated with polarization maintaining fibers (PM) require sophisticated technological decisions which still do not guarantee the reliable operation of the coupler.

A further approach includes determining the light power based on the measurement of light emanating from one or more joining points or splices between adjoining optical fibers. As one of ordinary skills in the laser arts is well aware, the power readings at splices vary due to external and internal factors such as ambient and inner laser temperature fluctuations and mechanical stresses. For example, a laser system is turned on at an ambient temperature of about 70° F. and has an operating temperature of about 90° F. Ideally, once the laser system heats up to its operating temperature, the latter stays unchanged as long as the system operates. However, in reality, the ambient and operating temperatures are rarely, if ever, remain constant. The temperature fluctuation affects components of a laser system imposing additional mechanical stresses on fibers. In combination, the external factors are responsible, among others, for changing a speckling pattern, altering polarization and geometry of laser systems all of which detrimentally affect the power readings by a photodiode.

A need therefore exists for a power measuring assembly operative to isolate a splice area from external factors so as to maintain a stabilized temperature at the splice between two fibers during the operation of a source of coherent light.

A further need exists for a power measuring assembly operative to make power readings at splices independent from external and internal physical factors while maintaining a substantially constant temperature at splices.

SUMMARY OF THE DISCLOSURE

These needs are satisfied by a power measuring device or unit operative to stabilize the temperature at an adjoining point or splice between multiple fibers and protect the splice from external mechanical stresses. Accordingly, in contrast to the known prior art, the disclosed device allows for readings of power of laser light at one or multiple splices which are not affected by temperature fluctuations and mechanical stresses.

In accordance with the disclosure, a splice area including ends of respective fibers spliced together is maintained in the environment characterized by substantially constant temperatures unaffected or insubstantially affected by thermal and mechanical changes of the entire laser system and its environment. The stabilized splice temperature is provided by a power measuring assembly based on a Peltier effect and operative to monitor and control a splice temperature at the desired splice temperature.

The power measuring assembly is configured with a fiber-supporting module receiving the spliced fibers, a housing enclosing the module and a peltier thermoelectric cooler (TEC) which includes a peltier element and thermo sensor and is supported by a heatsink/fan combination to cool the TEC. Once the change of splice temperature is detected to exceed the predetermined reference value, the TEC is operative to restore the splice temperature to the desired threshold.

In accordance with a further aspect of the disclosure, a splice area is practically unaffected by external mechanical stresses that may be caused by a variety of causes including varying external and internal temperatures. In one configuration, the components of the housing are coupled to one another so as to have the adjoined fibers mechanically stabilized and shielded against external mechanical/bending stresses or loads. In addition, putting material may filling up the housing so as to provide an additional cushion dumping external mechanical stresses so that the spliced fibers are practically not affected by external bending stresses.

In accordance with another aspect of the disclosure, the putting material is made from a highly thermo-conductive material conveying heat from a splice area to a TEC in a very short period of time. Accordingly, the power readings are being conducted in real time without undue delays which, if present, render these measurements obsolete. In the configuration without the putting material, the housing and the module are made from material capable of effectively conducting heat.

The above and other aspects and features of the disclosure will become more readily apparent from the following specific description.

BRIEF DESCRIPTION OF THE DRAWINGS

The specific description is accompanied by the following drawings, in which.

SPECIFIC DESCRIPTION

Figure 1A:
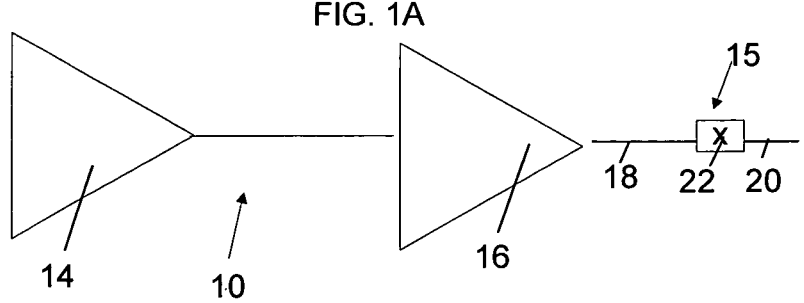
FIG. 1 is a diagrammatic view of a fiber laser system with a power measuring assembly configured in accordance with the present disclosure.

Reference will now be made in detail to the disclosed system. Wherever possible, same or similar reference numerals are used in the drawings and the description to refer to the same or like parts or steps. The drawings are in simplified form and are far from precise scale.

Figure 1B:
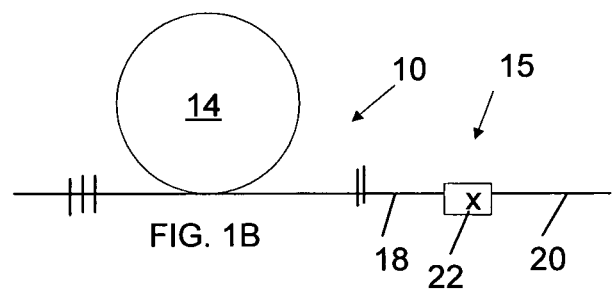

FIGS. 1A and 1B illustrate a relevant part exemplary laser systems 10 provided with a measuring assembly 15 which is configured in accordance with the present disclosure. The measuring assembly 15 is operative to perform power readings at a splice 22 between two adjoining fibers 18 and 20, respectively. The light signal radiated, for example, by a gain block 14 may be coupled into a subsequent gain block 16 in FIG. 1A or be the output signal in FIG. 1B. Typically, during the operation of laser system 10, both an ambient temperature and operating temperature of laser system 10 tend to vary. As empirically verified, the temperature changes detrimentally affect the power measurement of laser light scattered at splice 22 for the reasons discussed hereinbelow. The disclosed power measuring assembly 15 is operative to detect a temperature change at a splice area including the adjoining ends of respective fibers 18 and 20 and splice 22, determine if this change exceeds a reference value, and, if it does, controllably drive the temperature to the desired level.

Figure 2:
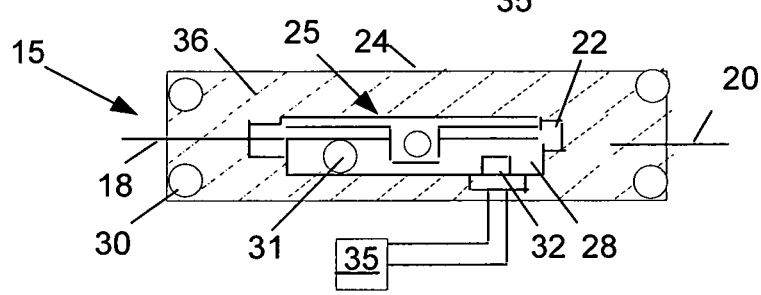
FIG. 2 is a top view of the measuring assembly.
Figure 3:
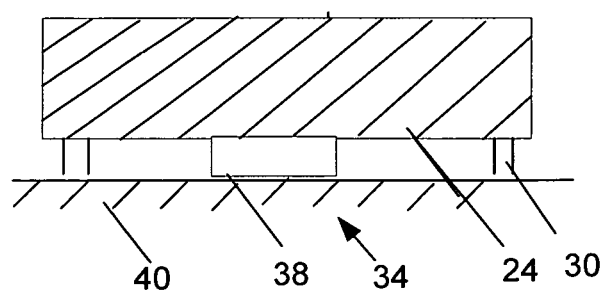
FIG. 3 is a side view of the measuring assembly.
Figure 4:
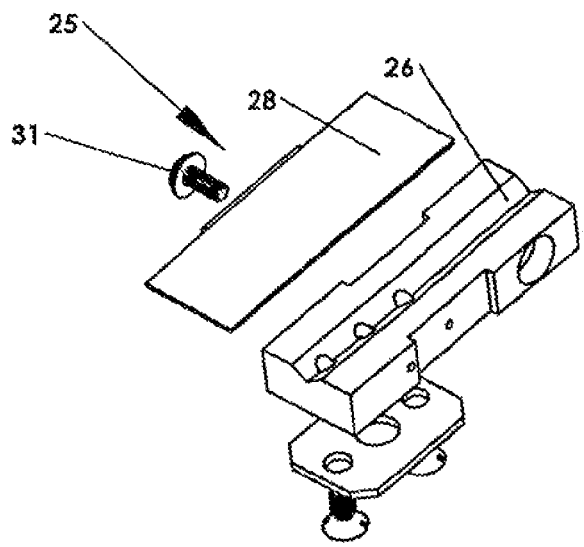
FIG. 4 is an exploded view of a power measuring device without the housing of the assembly of FIGS. 2 and 3.

Referring to FIGS. 2-4, measuring assembly 15 is configured with a housing 24 receiving a fiber supporting module 25 which is better illustrated in FIG. 4. The module 25 may have one of its sides provided with a V- or U-shaped bed or groove 26 (FIG. 4) which receives a fiber bed made of scattering material and having the shape which is complementary to that one of groove 26 (FIG. 4). The fiber bed, in turn, supports fibers 18 and 20 fusion spliced together so as to define splice 22. Alternatively, the fibers can be coupled to the side module 25 which may be flat, not structured. A holder 28 is detachably coupled to module 25 by a fastener 31 and covers the adjoined fibers so as to provide mechanical stability either alone or in combination with material 36, as explained below, to spliced fibers 18 and 20 remaining, thus, well protected from external mechanical stresses.

As a portion of light signal scatters through splice 22, it encounters a photodetector, such as photodiode 32, mounted in the immediate vicinity of splice 22 and operative to convert light signals into electric signals. The converted signals are coupled into a processing unit 35 and, upon evaluating, a feedback signal, if necessary, is sent to alter driving current of a pump (not shown) so as to reduce or increase the pump power in case the processed signals are not satisfactory.

The interior of housing 24 may be optionally filled with heat-conductive material 36 preferably made from a mixture of copper and silicone and encapsulating fibers 18 and 20. The percentage of copper may vary from about 50% to approximately 95% of the entire mixture. If used, material 36 adds positional stability to the spliced fibers which are thus reliable displaceably fixed relative to one another and to the rest of system 10. Also, material 36 conducts heat between splice 22 and housing 24, which is turn, as disclosed below, is in thermal contact with a means 34 operative to continuously monitor a splice temperature. Alternatively, if material 36 is not used, heat may be conducted by convection. In either configuration, the splice temperature, if a need arises, is altered to the desired level practically immediately upon the occurrence of the undesired thermal condition.

The means 34 for monitoring splice temperature is configured with a thermoelectric cooler (TEC). The operation of the TEC is well known to those skilled in the thermodynamic arts and based on the Peltier effect creating a heat flux between the junction of two different types of materials. In particular, a typical thermoelectric cooler is configured with an array of p- and n-type semiconductor elements that act as the two dissimilar conductors. The array of elements is soldered between two ceramic plates, electrically in series and thermally in parallel. As a dc current passes through one or more pairs of elements from n- to p-, there is a decrease in temperature at the junction ("cold side") resulting in the absorption of heat from the environment. The heat is carried through the cooler by electron transport and released on the opposite ("hot") side. The effectiveness of the TEC at moving the heat away from the cold side is totally dependent upon the amount of current provided and how well the heat from the hot side can be removed. As heat is applied to the cold side of the TEC, the temperature differential is suppressed. Effectively, one trades temperature differential for heat pumping.

Accordingly, in order to eliminate the influence of external and laser temperatures that, in turn, cause additional bending stresses so detrimental to fibers 18 and 20, as explained below, a thermoelectric Peltier element 38 is provided. One side of element 38 is in thermal contact with heat radiating housing 24, whereas the other side in contact with heatsink 40 coupled to housing 24 by fasteners 30. The TEC further has at least one temperature sensor (not shown) coupled to the Peltier element and electrically connected to controller and/or stabilizer of the temperature, such as the same processing unit 35.

In operation, as the heat is coupled out from housing 24 and processes by the TEC, the thermal conditions are monitored in accordance with the principle disclosed above. Typically, splice temperatures tend to rise and, thus, the splice environment needs to be cooled. However, it is conceivable that the splice temperatures can fall. The TEC, of course, is primarily used for cooling, because heating can be achieved more easily and economically by many other methods. But if a single device is to be used for both heating and cooling, the use of the TEC may be desirable. Having detected the splice temperature differ from a reference at an unacceptable value, processor 35 sends a signal modifying the condition of the TEC.

Figure 5:
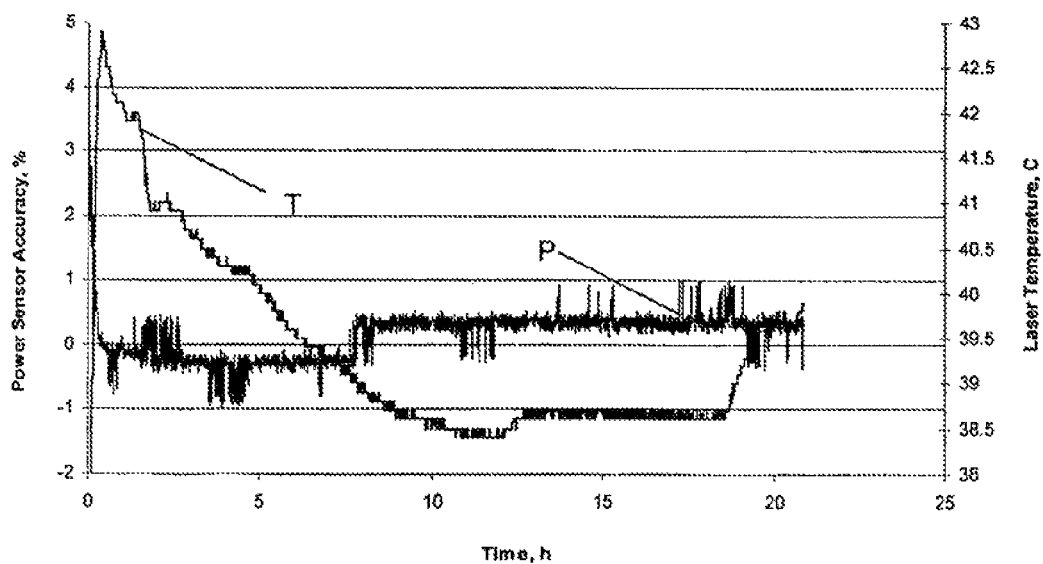
FIG. 5 is a graph illustrating operating temperature and power measuring accuracy of a photodetector in the laser system of FIG. 1 provided with the disclosed measuring assembly.

FIG. 5 clearly illustrates the benefits of using disclose measuring assembly 15. In particular, while an operating temperature T of laser system 10 (FIGS. 1A and 1B) undergoes considerable changes, the power P readings (P measured by photodiode 32 over the actual laser power) enjoy the desirable stability. Accordingly, the use of disclosed power measuring assembly 15 allows for creating a substantially thermally uniform environment surrounding splice 22 and stable laser power measurements which are read independently from external factors.

It is believed that the temperature changes at splice 22 cause changes in a speckle pattern. If this pattern is static, as one of ordinary skills readily realizes, a single spot incident upon the surface of photodiode 32 carries the intensity proportional to the laser power. However, once the pattern starts moving, which primarily is the result of external bending stresses caused by changes in temperature, the detected intensity is not indicative of actual power.

If light of low coherence (i.e. made up of many wavelengths) is used, a speckle pattern is difficult to observe, because multiple speckle patterns produced by respective individual wavelengths have different dimensions and will normally average one another out. The result of this process will be manifested by a substantially single bright spot carrying the intensity substantially proportional to the power of the light signal.

However, in laser systems radiating highly coherent light—the light including a few wavelengths—the speckle patterns do not average one another. As a consequence, photodiode 32 may, for example, receive more than a single bright spot which would lead to incorrect light intensity information. As a consequence, while temperature fluctuations somewhat affect power readings in broad linewidth laser devices, they are particularly detrimental to a narrow linewidth lasers having MOPFA and Fabri-Perot configurations which radiate coherent light. FIG. 1A a single frequency laser system or MOPFA, whereas FIG. 1B illustrate a F-P oscillator including a pig-tailed fiber and a pair of Bragg fiber gratings written therein.

It will be apparent to those skilled in the art that various modifications and variations can be made in the presently disclosed laser powerful system. It is intended that the present disclosure cover the modifications and variations of this disclosure provided they come within the scope of the appended claims and their equivalents.

The invention claimed is:

1. A fiber laser system comprising:
   a light source outputting light;
   a plurality of fibers guiding the output light and having respective ends joined at a splice, a portion of the output light being scattered through the splice;
   a photodetector configured to sense a power of the portion of the output light;
   a thermoelectric element being in thermal contact with the splice and operative to controllably maintain a substantially constant temperature at the splice so as to maximize an accuracy of power readings at the constant temperature.

2. The fiber laser system of claim 1, wherein the temperature fluctuation includes changes of an ambient temperature or laser system operating temperature or a combination thereof.

3. The fiber laser system of claim 1, wherein the thermoelectric element includes a thermoelectric cooler (TEC) with a Peltier element, a temperature sensor coupled to the Peltier element, and a controller coupled to the temperature sensor and operative to output a governing signal which controls the Peltier element so as to maintain the substantially constant temperature at the splice.

4. The fiber laser system of claim 3, wherein the power measuring assembly is further configured with:
   a housing in thermal contact with the TEC; and
   a module mounted in the housing and operative to support the adjoined fibers and the splice so as to substantially shield the fibers from external mechanical loads.

5. The fiber laser system of claim 4, wherein the fibers are directly coupled to a surface of the module.

6. The fiber system of claim 5, wherein the module has a surface provided with an elongated groove and a profile made from light scattering material and received in the groove so as to support the adjoined fibers, the profile and groove having respective outer and inner peripheral surfaces extending complementary to one another.

7. The fiber system of claim 4 further comprising heat-conductive material filling the housing and in thermal contact with the splice so as to provide heat communication between the splice and the TEC.

8. The fiber laser system of claim 7, wherein the heat-conductive material includes a mixture of copper and silicone including from approximately 50% to approximately 95% of copper.

9. The fiber laser system of claim 4 further comprising a heat sink spaced from the housing and supporting the TEC.

10. The fiber laser system of claim 4, wherein the photodetector is mounted to the housing adjacently to the splice and capable of intercepting scattering light which is emanated from the splice.

11. The fiber laser system of claim 1 further comprising a holder detachably coupled to the module so that the adjoined fibers are reliably sandwiched between the module and the holder.

* * * * *